(12) United States Patent
Schmitt

(10) Patent No.: US 9,441,736 B2
(45) Date of Patent: Sep. 13, 2016

(54) RADIAL SHAFT SEALING RING, AND METHOD OF FABRICATING A RADIAL SHAFT SEALING RING

(75) Inventor: Wolfgang Schmitt, Viernheim (DE)

(73) Assignee: BRUSS SEALING SYSTEMS GMBH, Hoisdorf (DE)

( * ) Notice: Subject to any disclaimer, the term of this patent is extended or adjusted under 35 U.S.C. 154(b) by 819 days.

(21) Appl. No.: 13/168,509

(22) Filed: Jun. 24, 2011

(65) Prior Publication Data

US 2011/0316238 A1    Dec. 29, 2011

(30) Foreign Application Priority Data

Jun. 25, 2010  (EP) .................................. 10006622

(51) Int. Cl.
 F16J 15/3244   (2016.01)
 F16J 15/32     (2016.01)

(52) U.S. Cl.
 CPC .......... *F16J 15/3244* (2013.01); *F16J 15/328* (2013.01); *F16J 15/3284* (2013.01)

(58) Field of Classification Search
 USPC ........................................ 277/559, 551, 562
 See application file for complete search history.

(56) References Cited

U.S. PATENT DOCUMENTS

| | | | | |
|---|---|---|---|---|
| 3,660,192 A * | 5/1972 | Smith et al. | | 156/155 |
| 4,155,560 A * | 5/1979 | Repella | | 277/309 |
| 4,433,846 A * | 2/1984 | Romero et al. | | 277/551 |
| 4,669,737 A * | 6/1987 | Diffenderfer | | 277/551 |
| 4,844,484 A * | 7/1989 | Antonini et al. | | 277/561 |
| 4,969,653 A * | 11/1990 | Breen | | 277/561 |
| 5,244,215 A * | 9/1993 | Cather et al. | | 277/309 |
| 6,079,715 A * | 6/2000 | Johnen et al. | | 277/565 |
| 6,454,269 B2 * | 9/2002 | Alm et al. | | 277/370 |
| 6,945,537 B2 * | 9/2005 | Guillerme et al. | | 277/559 |
| 6,988,733 B2 * | 1/2006 | Hatch | | 277/571 |
| 7,004,471 B2 * | 2/2006 | Bryde et al. | | 277/318 |
| 7,066,471 B2 * | 6/2006 | Mause et al. | | 277/560 |
| 7,658,387 B2 * | 2/2010 | Park | | 277/559 |
| 7,770,897 B2 * | 8/2010 | Berdichevsky | | 277/551 |
| 7,959,157 B2 * | 6/2011 | Dobbs et al. | | 277/551 |
| 8,235,391 B2 * | 8/2012 | Hatch et al. | | 277/353 |
| 8,413,995 B2 * | 4/2013 | Matsui et al. | | 277/559 |
| 8,500,130 B2 * | 8/2013 | Sedlar et al. | | 277/560 |
| 2004/0160016 A1 * | 8/2004 | Hatch | | 277/551 |
| 2006/0012128 A1 * | 1/2006 | Lutaud | | 277/559 |
| 2006/0186604 A1 * | 8/2006 | Berdichevsky | | 277/559 |
| 2006/0290070 A1 * | 12/2006 | Park | | 277/559 |

(Continued)

FOREIGN PATENT DOCUMENTS

| | | |
|---|---|---|
| EP | 1561773 | 10/2005 |
| EP | 1992849 | 11/2008 |

(Continued)

*Primary Examiner* — Kristina Fulton
*Assistant Examiner* — Eugene G Byrd
(74) *Attorney, Agent, or Firm* — Saliwanchik, Lloyd & Eisenschenk

(57) ABSTRACT

A radial shaft sealing ring for sealing of a casing part of a motor vehicle engine or gearbox, with a supporting body and a sleeve-type sealing lip connected to the supporting body and bent towards the side to be sealed, which sealing lip lies on an axial length L on the shaft and has a conveying groove in the area of contact with the shaft for conveying of medium back into the volume to be sealed, and which sealing lip has a sufficient bending elasticity to achieve a sufficient contact pressure without the use of additional means, wherein the material of the sealing lip essentially consists of a high temperature cross-linked LSR liquid silicone material.

21 Claims, 1 Drawing Sheet

(56) References Cited

U.S. PATENT DOCUMENTS

| | | | |
|---|---|---|---|
| 2007/0284831 A1* | 12/2007 | Kurth | 277/551 |
| 2008/0073856 A1* | 3/2008 | Munekata | 277/559 |
| 2008/0284110 A1* | 11/2008 | Dahlheimer | 277/551 |
| 2009/0189357 A1* | 7/2009 | Madigan | 277/551 |
| 2010/0109252 A1* | 5/2010 | Matsui et al. | 277/559 |
| 2010/0181732 A1* | 7/2010 | Broisin | |
| 2010/0187768 A1* | 7/2010 | Sedlar et al. | 277/561 |
| 2010/0187769 A1* | 7/2010 | Sedlar et al. | 277/561 |

FOREIGN PATENT DOCUMENTS

| | | |
|---|---|---|
| FR | 1447749 | 6/1966 |
| FR | 2173571 | 5/1973 |

\* cited by examiner

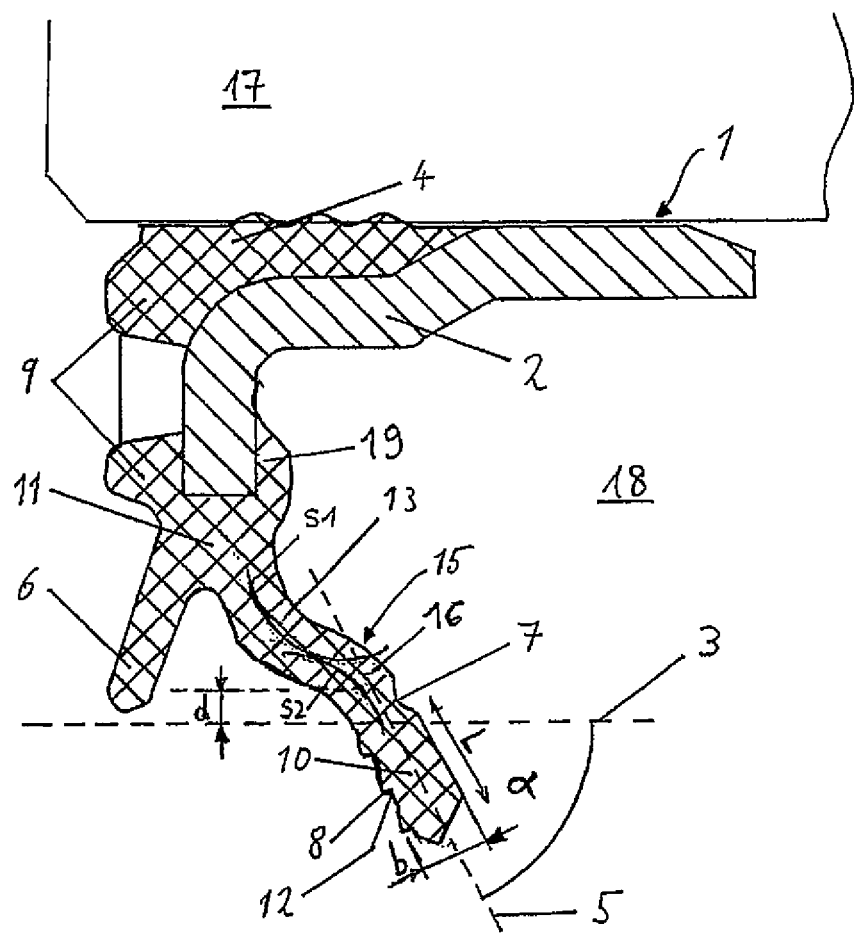

RADIAL SHAFT SEALING RING, AND METHOD OF FABRICATING A RADIAL SHAFT SEALING RING

The invention relates to a radial shaft sealing ring for sealing a casing part of a motor vehicle engine or gearbox, with a supporting body and a sleeve-type sealing lip connected to the supporting body which is bent towards the side to be sealed, lies on the shaft on an axial length L and has a conveying groove in the area of contact with the shaft for conveying of medium back into the volume to be sealed and that has a sufficient bending elasticity to achieve a sufficient contact pressure without additional means. The invention further relates to a method of fabricating a radial shaft sealing ring.

Radial shaft sealing rings for motor vehicles with such sleeve-type sealing lip made of PTFE are known for a long time, see H.-K. Muller "Abdichtung bewegter Maschinenteile", Medienverlag U. Muller, 1990. Recently sleeve-type sealing lips made of elastomer have been developed, see DE 100 33 446 C2. Because of permanent cost pressure there is a constant request for further lowering the costs of radial shaft sealing rings for motor vehicles.

FR 1 447 749 discloses a radial shaft sealing ring of which the sealing lip, for example consisting of Methyl-Vinyl-Silicone-caoutchouc (MVQ), is loaded by a ring coil spring and is therefore not generic.

EP 1 561 773 A1 describes a radial shaft sealing ring with a sealing lip of elastomer dispersed in a thermoplastic matrix.

EP 1 992 849 A1 and FR 2 173 571 disclose further radial shaft sealing rings.

The object addressed by the invention is to provide a lower-cost radial shaft sealing ring and a method for its fabrication maintaining the advantages of the sleeve-type sealing lip and the full sealing functionality.

The invention solves this object through radial shaft sealing ring for sealing of a casing part of a motor vehicle engine or gearbox, with a supporting body and a sleeve-type sealing lip connected to the supporting body and bent towards the side to be sealed, which sealing lip lies on an axial length L on the shaft and has a conveying groove in the area of contact with the shaft for conveying of medium back into the volume to be sealed, and which sealing lip has a sufficient bending elasticity to achieve a sufficient contact pressure without the use of additional means, wherein the material of the sealing lip essentially consists of a high temperature cross-linked LSR liquid silicone material, and a method of fabricating a radial shaft sealing ring with a supporting body and a sleeve-type sealing lip connected to the supporting body and bent towards the side to be sealed, which sealing lip lies on an axial length L on the shaft and has a conveying groove in the area of contact with the shaft for conveying of medium back into the volume to be sealed, wherein, for vulcanizing the sealing lip to the supporting body, a liquid silicone material is injected at high temperatures into a tool containing the supporting body. High temperature cross-linked silicone elastomers are heat resistant and elastic materials in the whole area of application, i.e. also at high engine temperatures, and cheaper than commonly used elastomers. Silicone caoutchouc or elastomer is generally commonly known as sealing material. But silicone materials show strong bulking in combination with various solvents, fuels and oils. In internal combustion engines strong bulking is caused in particular by fuel deposition into the motor compartment, for example by gasoline condensate, diesel or RME or FAME especially in the regeneration phase of a diesel catalytic converter. With alcohol-containing gasoline considerable amounts of alcohol can occur in the motor compartment because of condensation in short run operation, especially at low temperatures when the engine does not warm up and the alcohol from blow-by-gas condensed in the motor compartment does not evaporate. For these reasons silicone elastomer has not been considered so far for a generic sleeve-type sealing lip that lies on an axial length L on the shaft and has a conveying groove in the area of contact with the shaft for conveying of medium back into the volume to be sealed. In this design, due to bulking of the silicone material, bulging and lifting off of the sealing section from the shaft, and therefore loss of the sealing functionality and of the functionality of the conveying groove, seem unavoidable. However, surprisingly it turned out that it is possible to achieve a sufficient contact pressure and sealing effect, as well as conveying effect, with such a sleeve-type sealing lip made of silicone material despite strong bulking.

According to the invention the silicone material is a liquid silicone material, also called LSR or Liquid Silicone Rubber. Liquid silicone is a high temperature vulcanizing silicone caoutchouc that has a considerably lower viscosity during processing than solid silicones or common elastomers which is why liquid silicone can advantageously be processed by injection molding. The duration for the vulcanization of liquid silicone is thereby significantly shorter than the one of common elastomers. Therefore significantly shorter cycle times can be achieved in the fabrication. Generally fluoridated and non-fluoridated silicone materials can be used.

Preferably the liquid silicone material is addition cross linked, i.e. polymerized by a cross linking mechanism that is based on addition of Si—H-groups to silicon bonded vinyl groups which are preferably catalyzed by noble metal additives, particularly platinum. In contrast to the common peroxide cross linking no decomposition products are released which is advantageous for injection molding since sedimentation or deposits on the tools can be avoided. However, the invention is not limited to addition cross linking. In particular peroxide cross linking can be used if it is advantageous for certain reasons.

Preferably the angle between the sealing section of the sealing lip of the unmounted radial shaft sealing ring and the shaft has a value between 30° and 70° and has further preferably a value of at least 40°. That is a relatively steep setting angle in comparison to an elastomer sealing lip and adds to a sufficient contact pressure even if strong bulking of the sealing lip occurs.

Preferably the sealing lip's bent section between its connection to the supporting body and the sealing section is bent by a relatively small radius of curvature. Relatively small thereby relates to the radius of curvature of a conventional, single bent sleeve-type sealing lip which is bent in a mainly consistent radius in the whole area between the contact section with the shaft and the connection to the supporting body. More precisely the relatively small radius of curvature in line with the present invention preferably amounts to at most two thirds, further preferably at most half the radius of curvature of a conventional sleeve-type sealing lip. The section of the sealing lip bent by a relatively small radius of curvature has a distance d to the shaft which is preferably greater than zero. An unwanted contacting of the shaft in the area of the bent sealing lip section and resulting premature abrasion can then be avoided even in case of significant bulking of the sealing lip. Advantageously the distance d between the section bent by a relatively small radius of curvature and the shaft amounts to at least 50% and further preferably at least 100% of half of the thickness b of the sealing lip. In this case even a very strong bulking of the sealing lip to up to 100% of its original volume and more does not lead to a contacting with the shaft in the area of the bent section of the sealing lip.

Preferably the sealing lip has a counter bent section, especially merging into the sealing section between the connection to the supporting body and the sealing section. Counter bent in this case denotes that the bending of the concerned section is altogether opposite to the bending of the sealing lip. The counter bent section particularly allows the already mentioned advantageous relatively great setting angle of the sealing lip to the shaft. Particularly due to the counter bent section a favorable overall swan neck shape or S-shape of the sealing lip results. The swan neck shape of the sealing lip has proved to be a favorable shaping in order to achieve a sufficient but not to great contact pressure of the sealing lip to the shaft, irrespective of the degree of bulking that occurs within the limits of practical use.

Preferably the thickness b of the sealing section amounts to at least 0.9 mm to ensure a sufficient form stability despite the pressure tensions particularly caused by the bulking.

The invention is described in the following using an advantageous embodiment with reference to the attached figure. Therein:

FIG. 1 shows a partial cross-section through a radial shaft sealing ring according to the invention.

The radial shaft sealing ring 1 for sealing the shaft 3 shown by the dotted line, which is guided through a casing part 17 of a motor vehicle engine or gearbox, is shown in unmounted condition in FIG. 1. The sealing ring 1 has a circular supporting body 2 preferably consisting of metal or plastic material, and directly vulcanized to it a sealing element 11 with a sealing lip 15. The sealing lip 15 has a sealing section 10 which lies by an axial length L laminar on the shaft in an area of contact 8 in a mounted condition. The sealing lip 15 has a sufficient bending elasticity to achieve a contact pressure of the sealing section 10 sufficient to ensure the sealing functionality without additional means, particularly without a conventional ring coil spring. The sealing lip 15 further has one or more conveying grooves 12 on the side facing the shaft 3 for dynamic conveying of leaking oil or medium back into the volume to be sealed 18. The conveying groove 12 can in particular be spiraled or sectionally spiraled as in DE 100 33 446 C2 or wave-shaped and closed in itself as in DE 101 54 789 B4. The previously explained design is denoted as sleeve-type sealing lip in the context of the present application. The axial length L of the sealing section 10 contacting the shaft is preferably at least 0.5 mm. To avoid dry running and premature abrasion and to reduce the friction torque the contacting axial length L of the sealing section 10 is preferably 3 mm or less, further preferably 2 mm or less.

The sealing element 11 is fabricated from a high temperature cross-linked silicone material. The term silicone material includes for example MVQ, FMVQ, LSR, fluoridated LSR, without being limited to these. The following description relates to a favourable LSR (Liquid Silicone Rubber) material 9. A silicone caoutchouc of low viscosity is used as source material that contains mainly, for example 60% to 80%, silicone or poly(organo)siloxane with vinyl groups for cross linking and further for example 20% to 40% enforcing additives to adjust the desired mechanical attributes, as well as catalyzing additives for example platinum to catalyze the cross linking reaction. Preferably, however, the material of the sealing element 11 is free of thermoplastic components which may have negative effects. Preferably, therefore, the source material of the sealing element 11 consists of silicone caoutchouc with possible enforcing additives and/or catalyzing additives both free of thermoplastic components.

The HTV (high temperature cross linking) liquid silicone caoutchouc, which is preferably a two component system, is preferably polymerized by addition cross linking, i.e. by addition of Si-H groups to silicon bonded vinyl groups. The liquid silicone caoutchouc components have a sufficiently low viscosity to be processable in an injection molding machine. To adjust the processing time ("Topfzeit") until the cross linking starts one of the components preferably contains an inhibitor or processing time controlling component. To the other component a catalyst is preferably added, specifically a noble metal compound. The two liquid silicone components are injected into a tool into which the supporting body 2 has been placed. The cross linking starts through influence of the tool temperature, which is more than 100° C., preferably more than 150° C. and in particular, depending on the silicone caoutchouc, ranges from 160° C. to 220° C. At these temperatures the cross linking reaction proceeds very fast at 5 s per mm wall thickness, so that considerably shorter cycle times compared to conventional elastomers can be achieved.

The center axis 5 of the sealing section 10 in unmounted condition forms a setting angle to the shaft 3 of preferably at least 30°, further preferably at least 40°, even further preferably at least 50°, for example 60°. This rather steep setting angle compared to a conventional elastomer sleeve-type sealing lip adds to a sufficient contact pressure of the sealing section 10 to the shaft 3 even if significant bulking of the sealing lip 15 occurs. The setting angle is preferably less than 70° to achieve ideal contact pressure conditions. The sealing lip 15 is dimensioned in a way that the contact pressure relating to the circumference of the shaft 3 ranges from 0.2 N/cm to 0.8 N/cm, preferably from 0.3 N/cm to 0.6 N/cm.

Adjacent to the connection area 19 the sealing lip 15 has a bent section 13 preferably bent by a relatively small radius of curvature. Referring to FIG. 1, in this bent section 13 a circle S1 is inscribed along the middle axis of the sealing lip 15, the radius of which is significantly smaller, preferably at least two thirds, further preferably at least 50% smaller than the radius of curvature of a conventional, single bent sleeve-type sealing lip. If one imagines the bent section 13 continuing along the circle line S1, this results in the distance d shown in FIG. 1 of the bent section 13 to the shaft 3 to be greater than zero. Due to the distance d, even in the case of a significant bulking the sealing lip 15 does not have an unwanted contact with the shaft 3 in the region between the connection 19 and the sealing section 10. If the distance d is preferably more than 50%, further preferably more than 100% of half of the thickness b of the sealing lip 15 this applies even for very strong bulking of up to 100% of the original volume and more.

The sealing lip 15 has a counter bent section 16 preferably bent by a relatively small radius of curvature, that in particular merges into the sealing section 10. Referring to FIG. 1, in this counter bent section 16 a circle S2 is inscribed along the middle axis of the sealing lip 15, the radius of which is significantly smaller, preferably at least 50% smaller than the radius of a conventional, single bent sleeve-type sealing lip. The counter bent section 16 is in particular counter bent to the sealing lip 15 and/or counter bent to the bent section 13. The counter bending of the counter bent section 16 adds to a sufficient contact pressure of the sealing section 10 to the shaft 3 even at significant bulking of the sealing lip 15.

As evident from FIG. 1 the sealing lip 15 as a whole has a swan neck shape. This has proved to be a favorable shaping to achieve a sufficient but not too great contact pressure of the sealing lip to the shaft, essentially independent from the degree of the bulking, within practical limits.

On the side of the sealing lip 15 opposite to the shaft 3 an advantageously circumferential groove-shaped recess 7 is provided preferably between the sealing section 10 and the transition section 13, 16 counteracting the transversal contraction of the sealing lip 15 which negatively affects the sealing effect, and improving the flexibility.

Taking into consideration the possibly significant bulking, the thickness b of the sealing section 10 is at least 0.9 mm to achieve a sufficient form stability despite the pressure strains exerted in particular by the bulking, and lies advantageously in the range between 0.9 mm to 1.2 mm.

A protecting lip 6 located on the atmosphere side 20 for protection from dirt and dust particles is preferably formed integrally with the sealing element 11. A static sealing element 4 fastened to the supporting body 2, in this example in the form of an exterior cylindrical body, to seal the sealing ring 1 against the casing part 17 is preferably likewise fabricated from the liquid silicone material 9. Advantageously all components 4, 6, 11 consisting of liquid silicone material 9 can be vulcanized to the supporting body 2 in one process step.

The invention claimed is:

1. A radial shaft sealing ring, comprising:
a supporting body; and
a sealing element connected to the supporting body,
wherein the sealing element comprises:
a sealing lip, wherein the sealing lip essentially consists of a high temperature cross-linked LSR liquid silicone material,
wherein the sealing lip comprises:
a connection section, wherein the connection section connects the sealing lip to the supporting body;
an arc section;
a counter arc section;
a sealing section,
wherein the arc section is adjacent to the connection section, is distal to the connection section, and is between the connection section and the counter arc section,
wherein the counter arc section is adjacent to the arc section, is distal to the arc section, and is between the arc section and the sealing section,
wherein the sealing section is adjacent to the counter arc section, and is distal to the counter arc section,
wherein a central axis of the sealing lip forms an angle with a longitudinal axis of the radial shaft sealing ring; and
a conveying groove; and
a protecting lip,
wherein the protecting lip is formed integrally with the connection section of the sealing lip,
wherein the protecting lip is located away from a volume to be sealed,
wherein when the radial shaft sealing ring is not positioned in a sealing position with respect to a shaft:
(a) the arc section curves in a manner such that a value of the angle the central axis forms with the longitudinal axis, at any position along the central axis of the sealing lip from a proximal end of the arc section to a distal end of the arc section, either decreases or remains constant with respect to the value of the angle the central axis forms with the longitudinal axis at any other position along the central axis of the sealing lip from the proximal end of the arc section to the distal end of the arc section that is more proximal,
(b) the counter arc section curves in a manner such that the value of the angle the central axis forms with the longitudinal axis, at any position along the central axis of the sealing lip from a proximal end of the counter arc section to a distal end of the counter arc section, either increases or remains constant with respect to the value of the angle the central axis forms with the longitudinal axis at any other position along the central axis of the sealing lip from the proximal end of the counter arc section to the distal end of the counter arc section that is more proximal, and
(c) the sealing section extends straight out from the counter arc section such that the value of the angle the central axis forms with the longitudinal axis, at any position along the central axis of the sealing lip from a proximal end of the sealing section to a distal end of the sealing section, is $\alpha$,
(d) the value of the angle the central axis of the sealing lip forms with the longitudinal axis of the radial shaft sealing ring at the distal end of the arc section is $\beta$, the value of the angle the central axis of the sealing lip forms with the longitudinal axis of the radial shaft sealing ring at the proximal end of the counter arc section is $\beta$, the value of the angle the central axis of the sealing lip forms with the longitudinal axis of the radial shaft sealing ring at the distal end of the counter arc section is $\alpha$, the value of the angle the central axis of the sealing lip forms with the longitudinal axis of the radial shaft sealing ring at the proximal end of the sealing section is $\alpha$, and $\alpha > \beta$.

2. The radial shaft sealing ring as claimed in claim 1, wherein the high temperature cross-linked LSR liquid silicone material is fabricated by injecting silicone caoutchouc of low viscosity at high temperatures into a tool.

3. The radial shaft sealing ring as claimed in claim 1, wherein the high temperature cross-linked LSR liquid silicone material is addition cross linked.

4. The radial shaft sealing ring as claimed in claim 1, wherein the high temperature cross-linked LSR liquid silicone material is peroxide cross linked.

5. The radial shaft sealing ring as claimed in claim 1, wherein when the radial shaft sealing ring is not positioned in the sealing position the value of the angle formed between the central axis of the sealing lip and the longitudinal axis of the radial shaft sealing ring, $\alpha$, is between 30° and 70°.

6. The radial shaft sealing ring as claimed in claim 1, wherein the radial shaft sealing ring is configured to be positioned in a sealing position with respect to a shaft having a circular cross-sectional shape of radius, r, and wherein when the radial shaft sealing ring is not positioned in a sealing position with respect to shaft, the arc section curves by an arc section radius of curvature, such that a circle following a sealing side of the arc section has a shortest distance from the longitudinal axis of the radial shaft sealing ring of (r +d), where d is at least 50% of a thickness of the sealing section, b.

7. The radial shaft sealing ring as claimed in claim 1,
wherein a thickness of the sealing section, b, is greater than 0.9 mm.

8. A method of sealing a casing part of a motor vehicle engine or gearbox having a shaft, comprising:
providing a casing part of a motor vehicle engine or gearbox having a shaft; and
positioning a radial shaft sealing ring in a sealing position with respect to the shaft, wherein the radial shaft sealing ring comprises:
a supporting body; and
a sealing element connected to the supporting body,
wherein the sealing element comprises:
a sealing lip,
wherein the sealing lip essentially consists of a high temperature cross-linked LSR liquid silicone material,
wherein the sealing lip comprises:
a connection section, wherein the connection section connects the sealing lip to the supporting body;
an arc section;
a counter arc section;
a sealing section,
wherein the arc section is adjacent to the connection section, is distal to the connection section, and is between the connection section and the counter arc section,
wherein the counter arc section is adjacent to the arc section, is distal to the arc section, and is between the arc section and the sealing section,
wherein the sealing section is adjacent to the counter arc section and is distal to the counter arc section,
wherein a central axis of the sealing lip forms an angle with a longitudinal axis of the radial shaft sealing ring; and
a conveying groove; and
a protecting lip,
wherein the protecting lip is formed integrally with the connection section of the sealing lip,
wherein the protecting lip is located away from a volume to be sealed,
wherein when the radial shaft sealing ring is not positioned in a sealing position with respect to a shaft:
(a) the arc section curves in a manner such that a value of the angle the central axis forms with the longitudinal axis, at any position along the central axis of the sealing lip from a proximal end of the arc section to a distal end of the arc section, either decreases or remains constant with respect to the value of the angle the central axis forms with the longitudinal axis at any other position along the central axis of the sealing lip from the proximal end of the arc section to the distal end of the arc section that is more proximal,
(b) the counter arc section curves in a manner such that the value of the angle the central axis forms with the longitudinal axis, at any position along the central axis of the sealing lip from a proximal end of the counter arc section to a distal end of the counter arc section, either increases or remains constant with respect to the value of the angle the central axis forms with the longitudinal axis at any other position along the central axis of the sealing lip from the proximal end of the counter arc section to the distal end of the counter arc section that is more proximal, and
(c) the sealing section extends straight out from the counter arc section such that the value of the angle the central axis forms with the longitudinal axis, at any position along the central axis of the sealing lip from a proximal end of the sealing section to a distal end of the sealing section, is $\alpha$,
(d) the value of the angle the central axis of the sealing lip forms with the longitudinal axis of the radial shaft sealing ring at the distal end of the arc section is $\beta$, the value of the angle the central axis of the sealing lip forms with the longitudinal axis of the radial shaft sealing ring at the proximal end of the counter arc section is $\beta$, the value of the angle the central axis of the sealing lip forms with the longitudinal axis of the radial shaft sealing ring at the distal end of the counter arc section is $\alpha$, the value of the angle the central axis of the sealing lip forms with the longitudinal axis of the radial shaft sealing ring at the proximal end of the sealing section is $\alpha$, and $\alpha > \beta$
wherein the sealing lip has a sufficient bending elasticity and the sealing lip is configured such that when the radial shaft sealing ring is positioned in a sealing position with respect to the shaft:
(i) the sealing section is in contact with an axial length L of the shaft;
(ii) the conveying groove is in an area of contact between the sealing section and the shaft;
(iii) the conveying groove conveys medium back into the volume to be sealed; and
(iv) the sealing lip achieves a sufficient contact pressure with the shaft to achieve sealing between the sealing lip and the shaft.

9. The method as claimed in claim 8,
wherein the high temperature cross-linked LSR liquid silicone material is fabricated by injecting silicone caoutchouc of low viscosity at high temperatures into a tool.

10. The method as claimed in claim 8,
wherein the high temperature cross-linked LSR liquid silicone material is addition cross linked.

11. The method as claimed in claim 8,
wherein the high temperature cross-linked LSR liquid silicone material is peroxide cross linked.

12. The method as claimed in claim 8,
wherein when the radial shaft sealing ring is not positioned in the sealing position the value of the angle between the central axis of the sealing lip and the longitudinal axis of the radial shaft sealing ring, $\alpha$, is between 30° and 70°.

13. The method as claimed in claim 8,
wherein the shaft has a circular cross-sectional of radius, r, and
wherein when the radial shaft sealing ring is not positioned in a sealing position with respect to the shaft, the arc section curves by an arc section radius of curvature, such that a circle following a sealing side of the arc section has a shortest distance from the longitudinal axis of the radial shaft sealing ring of (r+d), where d is at least 50% of a thickness of the sealing section, b.

14. The method as claimed in claim 8,
wherein a thickness of the sealing section, b, is greater than 0.9 mm.

15. The radial shaft sealing ring as claimed in claim 1,
wherein the radial shaft sealing ring is configured to be positioned in the sealing position with respect to the shaft without a ring coil spring, and
wherein the sealing lip has the sufficient bending elasticity and the sealing lip is configured such that when the radial shaft sealing ring is positioned in a sealing position with respect to a shaft the sealing lip achieves the sufficient contact pressure with the shaft to achieve sealing between the sealing lip and the shaft without a ring coil spring.

16. The method as claimed by claim 8,
wherein positioning the radial shaft sealing ring in the sealing position with respect to the shaft does not comprise using a ring coil spring, and
wherein the sealing lip has the sufficient bending elasticity and the sealing lip is configured such that when the radial shaft sealing ring is positioned in the sealing position with respect to the shaft the sealing lip achieves the sufficient contact pressure with the shaft to achieve sealing between the sealing lip and the shaft without a ring coil spring.

17. The radial shaft sealing ring according to claim 1,
wherein when the radial shaft sealing ring is not positioned in the sealing position the value of the angle between the central axis of the sealing lip and a longitudinal axis of the sealing ring, $\alpha$, is at least 50°.

18. The method according to claim 8,
wherein when the radial shaft sealing ring is not positioned in the sealing position the value of the angle between the central axis of the sealing section and a longitudinal axis of the sealing ring, $\alpha$, is at least 50°.

19. The radial shaft sealing ring according to claim 1,
wherein when the radial shaft sealing ring is not positioned in a sealing position with respect to a shaft, the radial shaft sealing ring is in an unmounted free state where no bending forces are applied to the radial shaft sealing ring.

20. The method according to claim 8,
wherein when the radial shaft sealing ring is not positioned in a sealing position with respect to a shaft, the radial shaft sealing ring is in an unmounted free state where no bending forces are applied to the radial shaft sealing ring.

21. A radial shaft and radial shaft sealing ring assembly, comprises:
a radial shaft sealing ring according to claim 1; and
a radial shaft,
wherein the sealing lip has a sufficient bending elasticity and is configured such that when the radial shaft sealing ring is positioned in the sealing position with respect to the shaft:
(i) the sealing section is in contact with an axial length L of the shaft;
(ii) the conveying groove is in an area of contact between the sealing section and the shaft;
(iii) the conveying groove conveys medium back into the volume to be sealed; and
(iv) the sealing lip achieves a sufficient contact pressure with the shaft to achieve sealing between the sealing lip and the radial shaft.

* * * * *